United States Patent [19]

Etienne

[11] 4,344,513

[45] Aug. 17, 1982

[54] TRANSMISSION MECHANISM COMPRISING A CLUTCH AND A GEAR BOX HAVING A PLURALITY OF SPEED RATIOS

[75] Inventor: Michel Etienne, Valmondois, France

[73] Assignees: Automobiles Peugeot; Societe Anonyme Automobiles Citroen, both of Paris, France

[21] Appl. No.: 154,990

[22] Filed: May 30, 1980

[30] Foreign Application Priority Data

Jun. 8, 1979 [FR] France ................. 79 14729

[51] Int. Cl.³ ............................................ B60K 41/28
[52] U.S. Cl. ................................ 192/.02 R; 192/.052; 192/.09; 192/.092; 192/103 R
[58] Field of Search .................. 192/.02 R, .033, .032, 192/.052, .076, .092, 103 R, .09; 74/866; 364/424.1

[56] References Cited

U.S. PATENT DOCUMENTS

| | | | |
|---|---|---|---|
| 3,645,366 | 2/1972 | Numazawa et al. | 192/0.092 X |
| 3,752,284 | 8/1973 | Brittain et al. | 192/0.052 X |
| 3,915,271 | 10/1975 | Harper | 192/0.033 |
| 4,262,335 | 4/1981 | Ahlen et al. | 74/866 X |
| 4,263,997 | 4/1981 | Poore | 192/103 R |
| 4,282,947 | 8/1981 | Kemper | 192/0.033 X |

Primary Examiner—George H. Krizmanich
Attorney, Agent, or Firm—Burns, Doane, Swecker & Mathis

[57] ABSTRACT

The mechanism comprises a clutch and a gear box having a plurality of speed ratios disposed between a motor and receiving means. Means are provided for acting on the speed of the motor so as to bring the input element and the output element of the clutch to substantially the same speed before the engagement of the clutch. The mechanism further comprises in combination a detector of the speed of the motor, a detector of the speed of the receiving means, a numeric calculator of the theoretical speed of one of these components as a function of the speed of the other component and of the engaged speed ratio of the gear box, and a comparator of the calculated speed and the measured speed which has its output connected to the means for acting on the speed of the motor.

4 Claims, 2 Drawing Figures

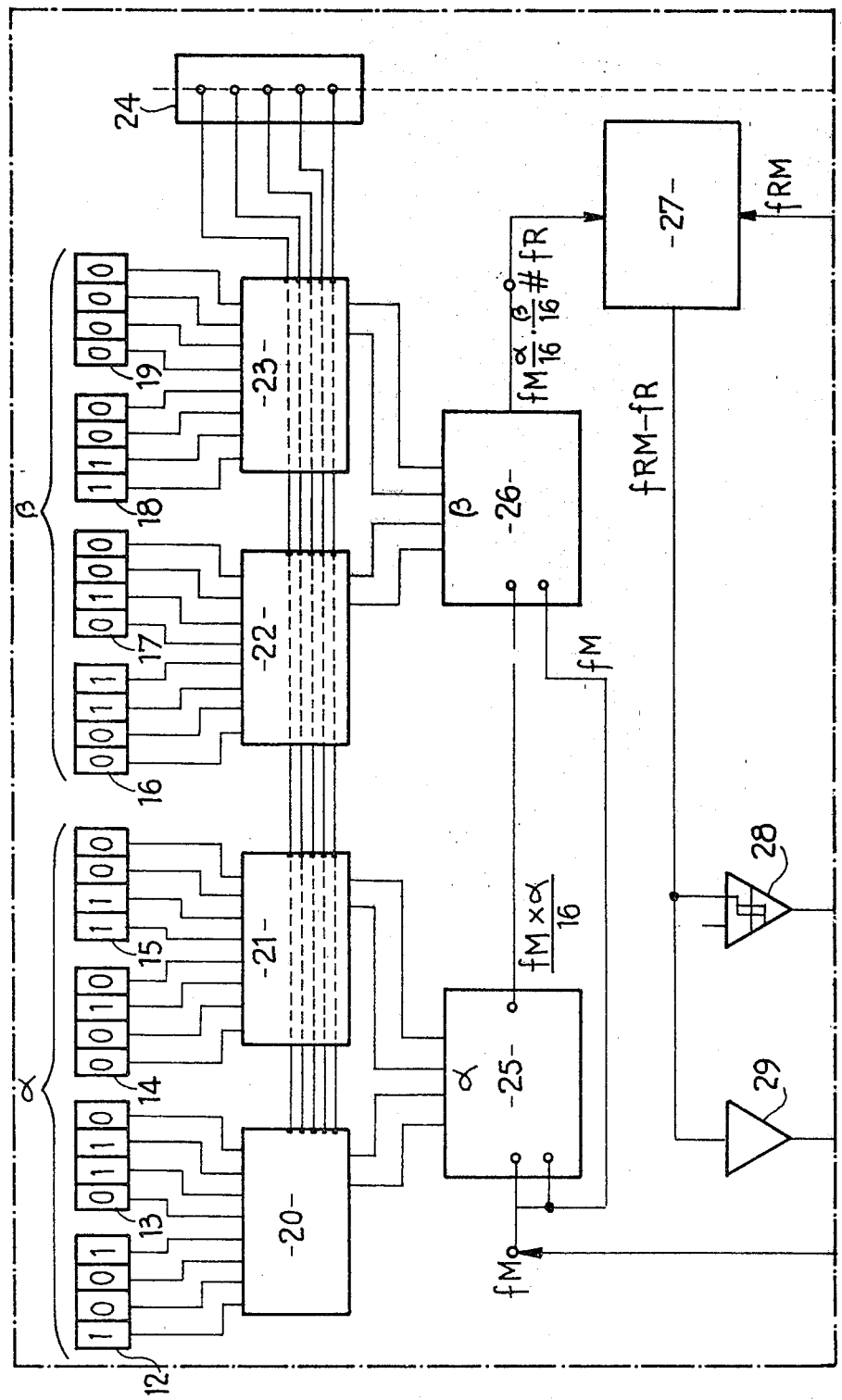

TRANSMISSION MECHANISM COMPRISING A CLUTCH AND A GEAR BOX HAVING A PLURALITY OF SPEED RATIOS

The present invention relates to an improvement in a transmission mechanism comprising a clutch and a gear box having a plurality of speed ratios disposed between a motor and receiving means. It, more particularly, but not exclusively, concerns automobile vehicles whether the latter be driven by a heat engine or an electric motor.

In an automobile vehicle, the motor transmits motion to the wheels through a gear box whose speed ratio must be adapted to the speed of travel of the vehicle so that the speed of the motor remains within certain limits. If after a change of speed ratio the clutch which connects the motor to the gear box is engaged while there is a marked difference between the speeds of its input and output elements, a jerk occurs which is particularly unpleasant for the occupants of the vehicle.

This is why devices have already been proposed for correcting the speed of the motor in accordance with the difference in speed existing between the input and output elements of the clutch, before its engagement, so that, at the moment of the engagement of the clutch, this difference is as small as possible.

Now, the speed of the output element of the clutch can only be measured when the speed ratio chosen in the gear box is completely engaged, which does not allow time enough to effect the necessary correction in the speed of the motor.

The object of the invention is to obtain a good concordance between the speeds of the input and output elements of the clutch by means of the measurement of the speed of rotation of the wheels of the vehicle owing to a particularly simple numeric calculator which gives a good approximation of the speed at which the wheels must rotate for a given speed of the motor and in accordance with the speed ratio of the gear box about to be engaged.

In this way, the correction of the speed of the motor can start before the ratio is completely engaged so that the motor reaches the correct speed sooner.

According to the invention, there is provided a transmission mechanism comprising a clutch and a gear box having a plurality of speed ratios, disposed between the motor and receiving means, means being provided for acting on the speed of the motor so as to bring the input and output elements of the clutch substantially to the same speed before the clutch is engaged.

This transmission mechanism, which also has a detector of the speed of the motor and a detector of the speed of the receiving means, comprises a numeric calculator of the theoretical speed of rotation of the receiving means as a function of the engaged speed ratio and a comparator of the calculated speed and the measured speed of the receiving means, the output of the comparator being connected to means acting on the speed of the motor.

The numeric calculator comprises an assembly of binary memories connected to multiplexers which select, as a function of the engaged speed ratio, predetermined coefficients which are fed into the memories, the outputs of the multiplexers being connected to at least two binary multipliers which are cascade connected.

Further features of the invention will be apparent from the ensuing description with reference to the accompanying drawings which are given solely by way of example and in which:

FIG. 2 is a view in more detail of the electronic part of the mechanism of FIG. 1.

Figure 1:
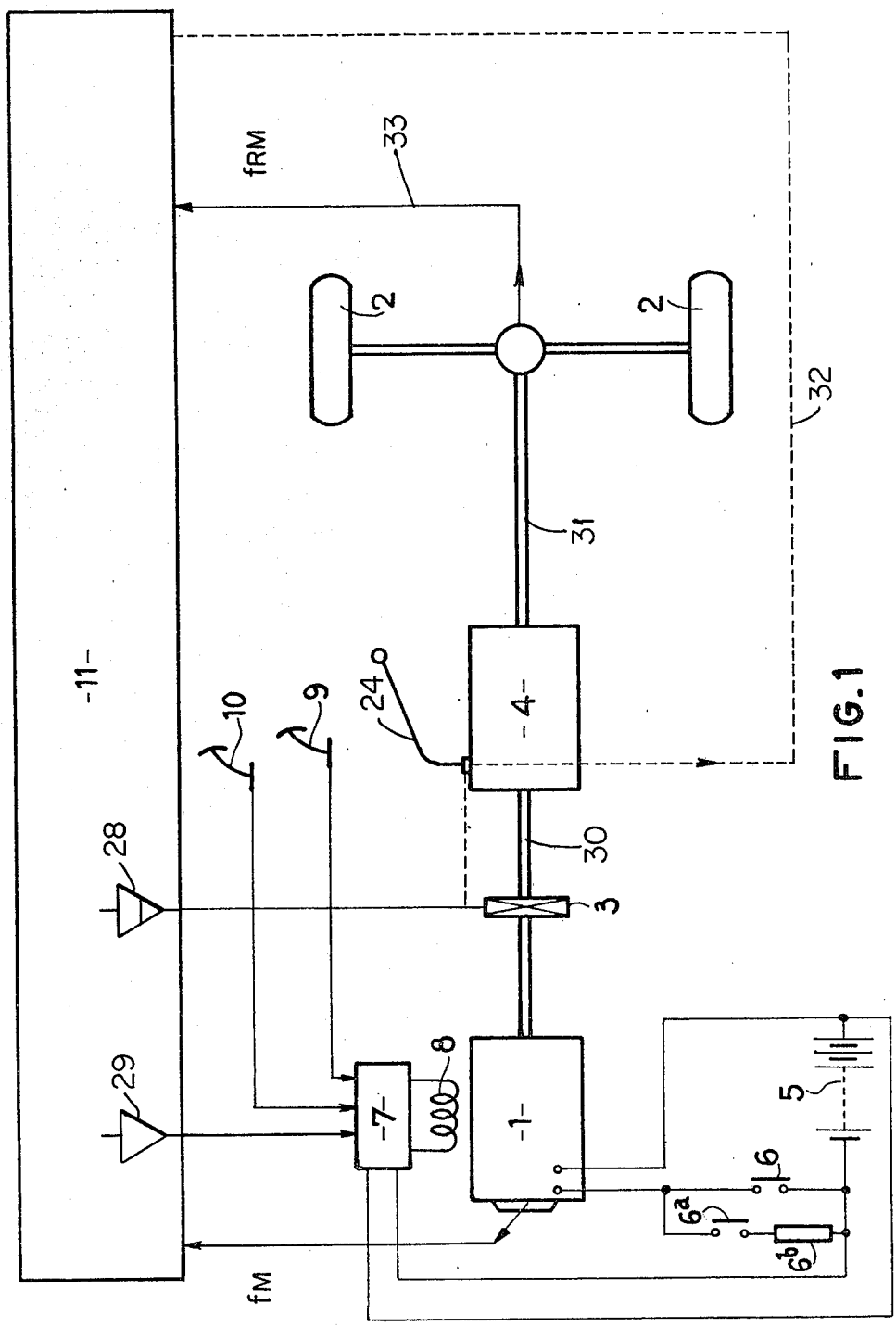
FIG. 1 is a diagrammatic view of the transmission mechanism according to the invention.

In the presently described embodiment:

The transmission mechanism is intended for an automobile vehicle.

The motor is an electric motor.

The gear box is manually controlled and has four speed ratios.

The clutch is released automatically by the change gear lever (for example by an electric switch placed on the lever).

The clutch is engaged automatically by a detector of a minimum difference $f_{RM} - f_R$.

However, the invention is also applicable in the following cases:

Any transmission mechanism other than that of an automobile vehicle.

With a heat or other engine.

With a manually controlled clutch.

With an automatic gear box.

With a number of transmission ratios smaller or greater than four.

The transmission mechanism illustrated in FIG. 1 comprises an electric motor 1 adapted to drive the driving wheels 2 of a vehicle through a clutch 3, clutch output shaft 30 gear box 4, and drive shaft 31 which is, in the described embodiment, a manual gear box having four speed ratios. The electric motor 1 is supplied with current by a battery 5 through a switch 6, or a switch $6^a$ and a resistor $6^b$ connected in series. The battery 5 also supplies current to a circuit 7 controlling the excitation winding 8 of the motor 1.

The circuit 7 is controlled by the accelerator pedal 9 and the brake pedal 10 and by a calculating circuit 11 shown in more detail in FIG. 2.

The circuit 11 is furthermore connected to the motor 1 and to the driving shaft 31 of the driving wheels by connection 33 and is controlled through connection 32 by the lever 24 of the gear box 4 in a coupled manner with the clutch 3.

As can be seen in FIG. 2, the circuit 11 comprises groups of memories 12 to 15 and 16 to 19 for four speed ratios.

The memories 12 to 15 are connected in pairs to multiplexers 20 and 21 and the memories 16 to 19 are connected in pairs to multiplexers 22 and 23.

All the multiplexers 20 to 23 are controlled by a selector 24 connected to the gear box 4.

The multiplexers 20 and 21 are connected to a first binary multiplier 25 multiplying by the number $\alpha/16$ and the multiplexers 22 and 23 are connected to a second binary multiplier 26 multiplying by the number $\beta/16$.

The binary multiplier 25 receives at an input a signal of frequency $f_M$ coming from the motor 1 and it is connected by another input and its output to the binary multiplier 26. The output of the latter is connected to a comparator 27 which receives moreover a signal of frequency $f_{RM}$ corresponding to the speed of rotation of the driving wheels 2.

The output of the comparator 27 is connected, on one hand, to a detector of a minimum difference 28 whose output is connected to the clutch 3 and, on the other hand, to an amplifier 29 connected to an input of the control circuit 7 of the excitation of the motor 1.

The mechanism just described operates in the following manner:

The electric motor 1 supplied with current by the battery 5 rotates at a given speed and drives the driving wheels 2 through the clutch 3 and the gear box 4.

The speed of the motor 1 is applied in the form of a signal of frequency $f_M$ to the input of the multiplier 25, and the speed of the driving wheels 2 is applied in the form of a signal of frequency $f_{RM}$ to the input of the comparator 27.

The fact that the two multipliers 25 and 26 are connected in cascade provides at their output a number equal to $\alpha \times \beta/256$ times the number of input pulses, $\alpha$ and $\beta$ being coefficients in a 0 to 4 bit binary code, which corresponds in decimals to values of $\alpha$ and $\beta$ between 0 and 15.

$$0 \leq \alpha, \beta \leq 15$$

This choice of coefficients $\alpha$ and $\beta$ gives a grid of 92 possibilities for the product $\alpha \times \beta/(256)$ between 0 and 0.8789.

The frequency of the signal $f_M$ is proportional to the speed of rotation of the motor 1.

This frequency is multiplied in the multiplier 25 by the number ($\alpha/16$), $\alpha$ being produced from the memories 12 to 15 by the multipliers 20 and 21, bearing in mind the selected speed ratio of the gear box 4, and transmitted through the circuit 24.

The output signal of the multiplier 25 is consequently equal to $(f_M \times \alpha)/(16)$.

This output is applied to the multiplier 26 to which is also applied the coefficient $\beta$ stored in the memories 16 to 19.

The output signal of the multiplier 26 is equal to $$\frac{f_M \times \alpha \times \beta}{16 \times 16} \# f_R$$

which corresponds to the speed of the wheels of the vehicle with the selected speed ratio.

The chosen ratio $(\alpha \times \beta)/(256)$ is the ratio which is the closest to the constructed mechanical transmission ratio so that there is obtained a calculated frequency $f_R$ which is close to the speed proportional to the real speed of rotation of the wheels 2 of the vehicle.

The precision obtained is within a few percent.

The signal $$\frac{f_M \times \alpha \times \beta}{256}$$

is compared with the signal $f_{RM}$ in the comparator 27 whose output signal is equal to the difference $f_{RM} - f_R$.

This signal is applied on one hand to the detector of the minimum difference 28 which close the contact between the driving and driven elements of the clutch 3 only if this difference is not greater than a predetermined value and, on the other hand, to the circuit 7 controlling the excitation of the electric motor 1 so as to cause a modification in the speed of rotation of said motor for the purpose of reducing the difference between the detected speed $f_{RM}$ and the calculated speed $f_R$ of the wheels of the vehicle whereby the clutch engagement can occur without jerks.

By way of example, with the values shown in FIG. 2 for the binary memories, the coefficients $\alpha$, $\beta$ and the ratio $(\alpha\beta)/(256)$ are the following:

|  | $\alpha$ | $\beta$ | $\dfrac{\alpha\beta}{256}$ |
| --- | --- | --- | --- |
| first speed ratio | 9 | 2 | 0.0703 |
| second speed ratio | 5 | 6 | 0.11718 |
| third speed ratio | 6 | 8 | 0.1875 |
| fourth speed ratio | 8 | 8 | 0.25 |

If desired, it would be possible to improve the precision (reduction in the difference between the transmission ratio and the closest ratio that the calculator can give) by employing a third coefficient $\gamma$, comparable to the coefficients $\alpha$ and $\beta$, and a third binary multiplier connected in cascade with the two previous multipliers.

In the embodiment described hereinbefore, the speed of the motor is corrected by an output signal of the comparator 27 whose inputs receive signals representing the real speed of the wheels and their theoretical speed calculated by the calculator 12 to 26, from the speed of the motor and the engaged speed ratio of the gear box.

In a same way, the speed of the motor may be corrected by an output signal of a comparator whose inputs receive signals representing the real speed of the motor and its theoretical speed calculated from the speed of the wheels and the engaged speed ratio of the gear box.

Having now described my invention, what I claim as new and desire to secure by Letters Patent is:

1. A transmission arrangement including:
  (a) a motor;
  (b) a gear box having a plurality of speed ratios;
  (c) a receiving means connected to the output of the gear box;
  (d) a clutch having an input and an output, said input connected to said motor, said output connected to said gear box;
  (e) means for detecting the actual speed of the motor;
  (f) means for detecting the actual speed of the receiving means;
  (g) means for altering the speed of the motor;
  (h) a digital means for calculating the theoretical speed of the receiving means as a function of the actual speed of the motor as detected by said means for detecting the actual speed of the motor, and also as a function of the engaged speed ratio of the gear box;
  (i) means for comparing said theoretical speed and the detected speed of the receiving means;
  (j) means for connecting the output of the comparing means to the motor speed altering means;
  (k) said digital calculating means including:
  (l) a plurality of binary memories;
  (m) a plurality of multiplexer means for obtaining, as a function of the engaged speed ratio, predetermined digital calculation co-efficients entered into the memories, the multiplexer means being connected to the memories;
  (n) at least two binary multipliers, connected in series, for multiplying the signal corresponding to said actual speed of the motor by said calculation co-efficients, said multipliers being connected to said multiplexers and to said comparator.

2. A transmission arrangement according to claim 1, including a threshold means for engaging the clutch only when the difference between theoretical speed of the receiving means and the actual speed of the receiving means is less than a predetermined value, said threshold means being connected to an output of said comparator.

3. A transmission arrangement including:
 (a) a motor;
 (b) a gear box having a plurality of speed ratios;
 (c) a receiving means connected to the output of the gear box;
 (d) a clutch having an input and an output, said input connected to said motor, said output connected to said gear box;
 (e) means for detecting the actual speed of the motor;
 (f) means for detecting the actual speed of the receiving means;
 (g) means for altering the speed of the motor;
 (h) a digital means for calculating the theoretical speed of the motor as a function of the actual speed of the receiving means detected by said means for detecting the actual speed of the receiving means, and also as a function of the engaged speed ratio of the gear box;
 (i) means for comparing said theoretical speed and the detected speed of the motor;
 (j) means for connecting the output of the comparing means to the motor speed altering means;
 (k) said digital calculating means including:
 (l) a plurality of binary memories;
 (m) a plurality of multiplexer means for obtaining, as a function of the engaged speed ratio, predetermined digital calculation coefficients entered into the memories, the multiplexer means being connected to the memories;
 (n) at least two binary multipliers, connected in series, for multiplying the signal corresponding to said actual speed of the receiving means by said calculation coefficients, said multipliers being connected to said multiplexers and to said comparator.

4. A transmission arrangement according to claim 3, including a threshold means for engaging the clutch only when the difference between theoretical speed of the motor and the actual speed of the motor is less than a predetermined value, said threshold means being connected to an output of said comparator.

* * * * *